United States Patent
Sherman et al.

(10) Patent No.: US 10,055,747 B1
(45) Date of Patent: Aug. 21, 2018

(54) CONSUMER PORTAL

(71) Applicant: Acxiom Corporation, Little Rock, AR (US)

(72) Inventors: Rochelle Sherman, Cape Coral, FL (US); Joshua Freeman, Conway, AR (US); Jennifer Barrett Glasgow, Little Rock, AR (US); David Nash, Conway, AR (US); Ann Kennedy, Omaha, NE (US)

(73) Assignee: Acxiom Corporation, Conway, AR (US)

( * ) Notice: Subject to any disclaimer, the term of this patent is extended or adjusted under 35 U.S.C. 154(b) by 789 days.

(21) Appl. No.: 14/308,491

(22) Filed: Jun. 18, 2014

Related U.S. Application Data

(60) Provisional application No. 61/929,195, filed on Jan. 20, 2014.

(51) Int. Cl.
*G06Q 10/00* (2012.01)
*G06Q 30/02* (2012.01)
*G06F 21/31* (2013.01)

(52) U.S. Cl.
CPC ......... *G06Q 30/0201* (2013.01); *G06F 21/31* (2013.01)

(58) Field of Classification Search
CPC ............................ G06Q 30/0201; G06F 21/31
See application file for complete search history.

(56) References Cited

U.S. PATENT DOCUMENTS

| | | | |
|---|---|---|---|
| 6,480,850 B1 * | 11/2002 | Veldhuisen | G06F 21/6245 707/600 |
| 7,376,680 B1 * | 5/2008 | Kettler | G06F 17/30303 |
| 7,895,121 B2 | 2/2011 | Lukose et al. | |
| 7,975,150 B1 | 7/2011 | Lillibridge et al. | |
| 8,015,117 B1 * | 9/2011 | Lillibridge | G06Q 20/382 705/64 |
| 8,260,806 B2 | 9/2012 | Steele et al. | |
| 8,266,058 B1 * | 9/2012 | Anderson | G06Q 20/351 705/30 |
| 8,312,273 B2 | 11/2012 | Nice et al. | |
| 8,521,778 B2 * | 8/2013 | James | H04L 67/306 707/784 |

(Continued)

FOREIGN PATENT DOCUMENTS

| | | | | |
|---|---|---|---|---|
| WO | WO 0154034 A1 * | 7/2001 | | G06Q 30/02 |
| WO | 02059804 A1 | 8/2002 | | |

OTHER PUBLICATIONS

Frank McSherry (Privacy Integrated Queries—An Extensible Platform for Privacy-Preserving Data Analysis, SIGMOD'09, Jun. 29-Jul. 2, 2009). (Year: 2009).*

(Continued)

*Primary Examiner* — Beth V Boswell (57) ABSTRACT

A consumer portal enables consumers to review data collected about those consumers in a privacy-protected manner, through authentication using personally identifiable information (PII) and a linking service supported by a marketing database. Once consumers review this data, they may then edit this data or determine whether they wish it to be used for marketing purposes. They are also presented with various opt-out facilities. The consumer portal is accessible by computers, tablets, smartphones, and other computing devices with Internet-access capabilities.

19 Claims, 8 Drawing Sheets

(56) References Cited

U.S. PATENT DOCUMENTS

| | | | |
|---|---|---|---|
| 8,538,817 B2 | 9/2013 | Wilson | |
| 8,606,626 B1* | 12/2013 | DeSoto | G06Q 30/00 705/14.26 |
| 2002/0091650 A1* | 7/2002 | Ellis | G06Q 20/383 705/74 |
| 2002/0099824 A1* | 7/2002 | Bender | G06F 21/6254 709/225 |
| 2003/0135512 A1* | 7/2003 | Morgan, Jr. | G06F 17/30882 |
| 2005/0005113 A1* | 1/2005 | Dillon | G06F 21/31 713/168 |
| 2006/0282662 A1* | 12/2006 | Whitcomb | G06F 21/33 713/156 |
| 2007/0156766 A1* | 7/2007 | Hoang | G06F 17/30014 |
| 2008/0103800 A1* | 5/2008 | Domenikos | G06Q 40/02 705/318 |
| 2008/0189169 A1 | 8/2008 | Turpin et al. | |
| 2008/0270385 A1* | 10/2008 | Manet | G06F 17/30566 |
| 2009/0024589 A1* | 1/2009 | Sood | G06F 17/30893 |
| 2009/0055323 A1* | 2/2009 | Rebidue | G06Q 20/105 705/66 |
| 2010/0094758 A1* | 4/2010 | Chamberlain | G06Q 10/06375 705/50 |
| 2010/0106593 A1 | 4/2010 | Willars et al. | |
| 2010/0205261 A1 | 8/2010 | Michel | |
| 2011/0035317 A1* | 2/2011 | Carlson | G06Q 20/102 705/40 |
| 2011/0060905 A1* | 3/2011 | Stack | G06Q 10/10 713/167 |
| 2011/0119178 A1* | 5/2011 | Clayton | G06Q 20/04 705/39 |
| 2011/0173222 A1* | 7/2011 | Sayal | G06F 17/30303 707/769 |
| 2012/0054680 A1* | 3/2012 | Moonka | G06Q 30/0269 715/810 |
| 2013/0124525 A1* | 5/2013 | Anderson | G06F 17/30286 707/737 |

OTHER PUBLICATIONS

Mutanen, Teemu, Consumer Data and Privacy in Ubiquitous Computing, Helsinki University of Technology (Jan. 11, 2007).

Wills, Craig E. et al., A Personalized Approach to Web Privacy—Awareness, Attitudes, and Actions, Computer Science Department, Worcester Polytechnic Institute (2011).

Ashworth, Laurence et al., Marketing Dataveillance and Digital Privacy: Using Theories of Justice to Understand Consumers' Online Privacy Concerns, Journal of Business Ethnics (2006).

* cited by examiner

CONSUMER PORTAL

CROSS-REFERENCE TO RELATED APPLICATIONS

This application claims the benefit of U.S. provisional patent application No. 61/929,195, entitled "Consumer Web Portal Apparatus and Method," filed on Jan. 20, 2014. Such application is incorporated herein by reference in its entirety.

STATEMENT REGARDING FEDERALLY SPONSORED RESEARCH OR DEVELOPMENT

Not applicable.

BACKGROUND OF THE INVENTION

The field of the invention is systems and methods by which consumers may manage marketing data that is collected about them.

Today, mass marketing is falling out of favor and more and more marketing is targeted toward groups of consumers with particular characteristics. The goal of this targeted marketing is to deliver a marketing message that is more likely to be of interest to the consumer, and thus create a greater return on investment for the retailer that is expending a portion of its advertising and marketing budget on the marketing message. At the same time, targeted advertising benefits the consumer because the consumer is receiving marketing messages that are more likely to be of interest, and is less likely to be delivered marketing messages that are of no interest or are a nuisance to the consumer.

In order to target advertisements to the most appropriate consumers, marketers collect data about the consumers. As the ability of marketers to collect data about consumers continues to grow, and the size and breadth of the databases that contain this data also grow, there has been an increasing desire on the part of consumers to have input on whether and how marketing data is collected and how it is used. The collection of such large amounts of data that is personal to consumers raises important privacy concerns, and the security of this information is a critical factor in the minds of consumers.

Consumers differ in how they wish to address the issues related to the collection of consumer data. Some consumers simply do not wish for marketers to collect data about them at all, and thus are willing to receive only mass-marketed messages that often are not relevant to them rather than allow the collection of data that would allow marketers to formulate a more targeted marketing message. Many consumers, on the other hand, prefer the targeted marketing messages made possible by the collection of this data, but are concerned about the security of this data. There are a growing number of consumers that are interested in establishing a quid pro quo with marketers—that there is value in offering up personal information in exchange for better information or more personalized offers. They see their data as something of value, and they wish to receive some return on that value from the marketers that use the data. As a result of these changing perceptions among consumers, the way that marketing is happening is changing dramatically. Nevertheless, many of these consumers remain concerned about the accuracy of the data that is collected about them, since if there are errors in this data the consumers may receive messages targeted to a person unlike them.

For a number of years, marketers have been offering "opt out" to consumers with respect to offline direct marketing, such as direct mail marketing campaigns. In the opt-out model, consumers may, if they choose, elect not to have personal data collected about them for marketing purposes, or not have that data used in marketing efforts. In some cases, opt out simply meant removing a particular consumer from a marketing list, such as a list used for telemarketing purposes. In some cases these opt-out lists have been maintained under various state laws, and in other cases they have been maintained by industry, marketing companies or retailers. The opt-out process has historically been a passive effort, because the only choice the consumer has is whether or not to opt out of receiving the marketing message. The consumer has no ability in this simple opt-out model to make any other choices concerning his or her data, cannot review data collected about him or her, and cannot augment or correct data about him or her. The existing opt-out model does not match up well with developing consumer attitudes and desires with respect to marketing information.

There is a growing consensus among both consumers and marketers that digital marketing needs to move toward a more consumer-controlled model, where the consumer has greater input with regard to marketing directed to that consumer and data collected about that consumer. While this model is of benefit to consumers, it is also believed that it benefits the marketers. For example, consumers who are empowered to review, correct, and augment the data collected about them enable the marketers to do a better job of targeting appropriate marketing messages to that consumer. Likewise, allowing consumers greater control over when and how marketing messages are delivered to them may improve the return-on-investment for the retailers who are paying for those marketing messages. It may be seen that a system and method that allows consumers to have greater power with respect to marketing data collected about them would be highly desirable; such a system and method, however, must be designed in order to allow the consumer to have this power while also protecting the privacy of data collected for each consumer. In particular, such a system and method should carefully authenticate the consumer before providing access to the consumer's data, in order to prevent fraud and to protect the privacy of the consumer.

BRIEF SUMMARY OF THE INVENTION

The present invention is directed to a portal whereby consumers may review data collected about them by a third party in a privacy-protected manner. In certain embodiments the consumers may then determine whether they wish to correct, update or delete any elements of this data, and may also be presented with various opt-out options. In certain embodiments, the portal may also present information to consumers enabling them to learn more about how consumer marketing data is used, how their privacy is protected, and why allowing the use of this data in a privacy-compliant manner may be beneficial to consumers. The present invention is further directed to a system and method for authenticating a consumer's identity who wishes to view data about him or her, in order to have a choice about what data is used for marketing purposes.

In certain embodiments, the portal may offer some or all of these advantages for consumers:

1. being informed and given peace of mind about third party marketing data, methods, purposes, and standard marketing practices;
2. verifying the identity of the non-credentialed consumer while creating an account and credentials in order to use and authenticate with the portal so that the authenticated consumer can view data about himself or herself, but where no one else can see that data and the consumer cannot see data about anyone else;

3. updating or deleting data about the consumer that will allow for better and more relevant marketing messages for products and services;
4. opting in to receive notices regarding news about the portal, site updates, and/or offers from the third party marketing services provider or trusted partners;
5. managing account settings;
6. blocking the use of web browser "cookies" for digital marketing purposes;
7. opting out of the marketing data about them being shared with marketers for digital marketing purposes; and
8. changing data elements to be relevant to "in time" events, such as back-to-school, new car shopping, and vacation plans.

Further in certain embodiments, the web portal is accessible to anyone with Internet access in a desired geographic region through a web browser or other technologies for accessing information over the Internet, using any consumer device capable of accessing the Internet, and may be used by any adult consumer.

These and other features, objects, and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
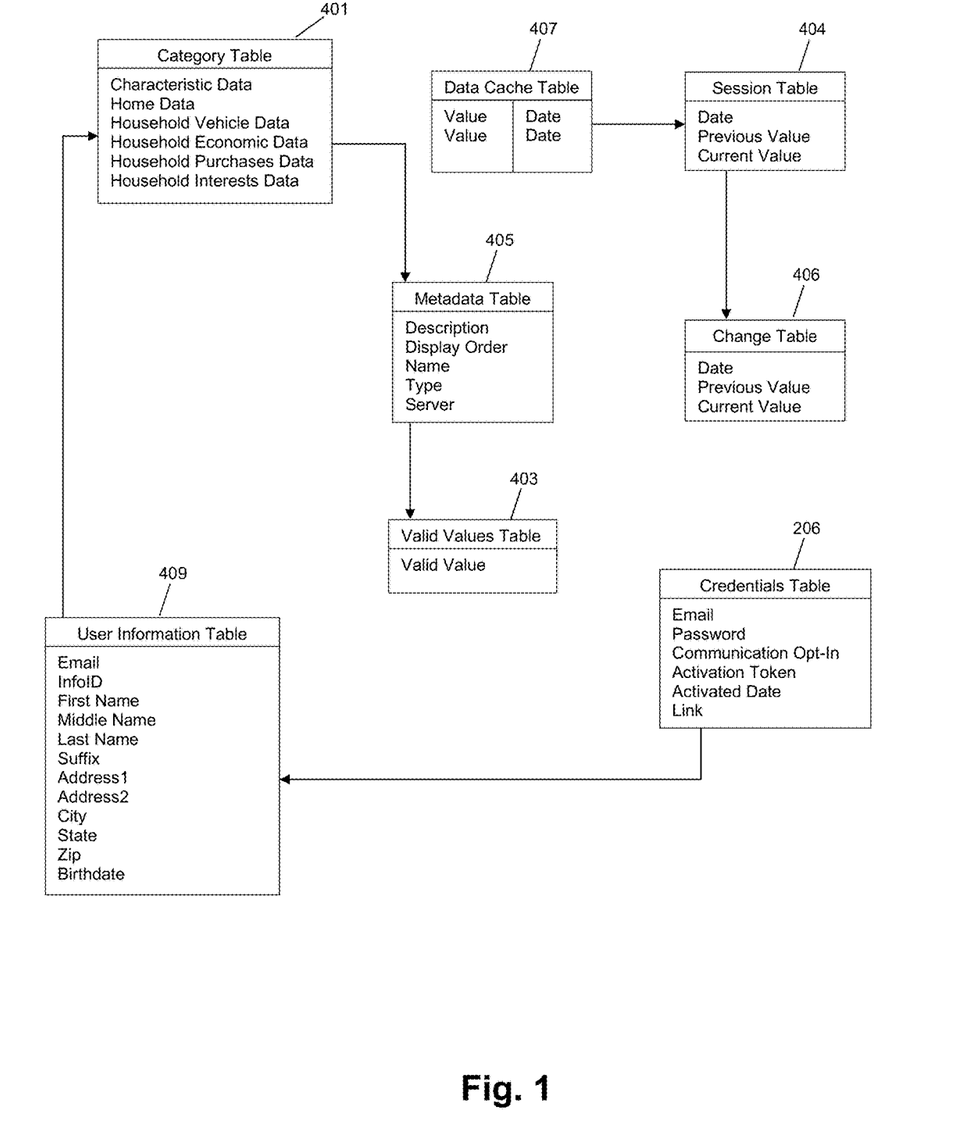
FIG. 1 is a diagram depicting certain data structures within a preferred embodiment of the present invention.
Figure 6A:
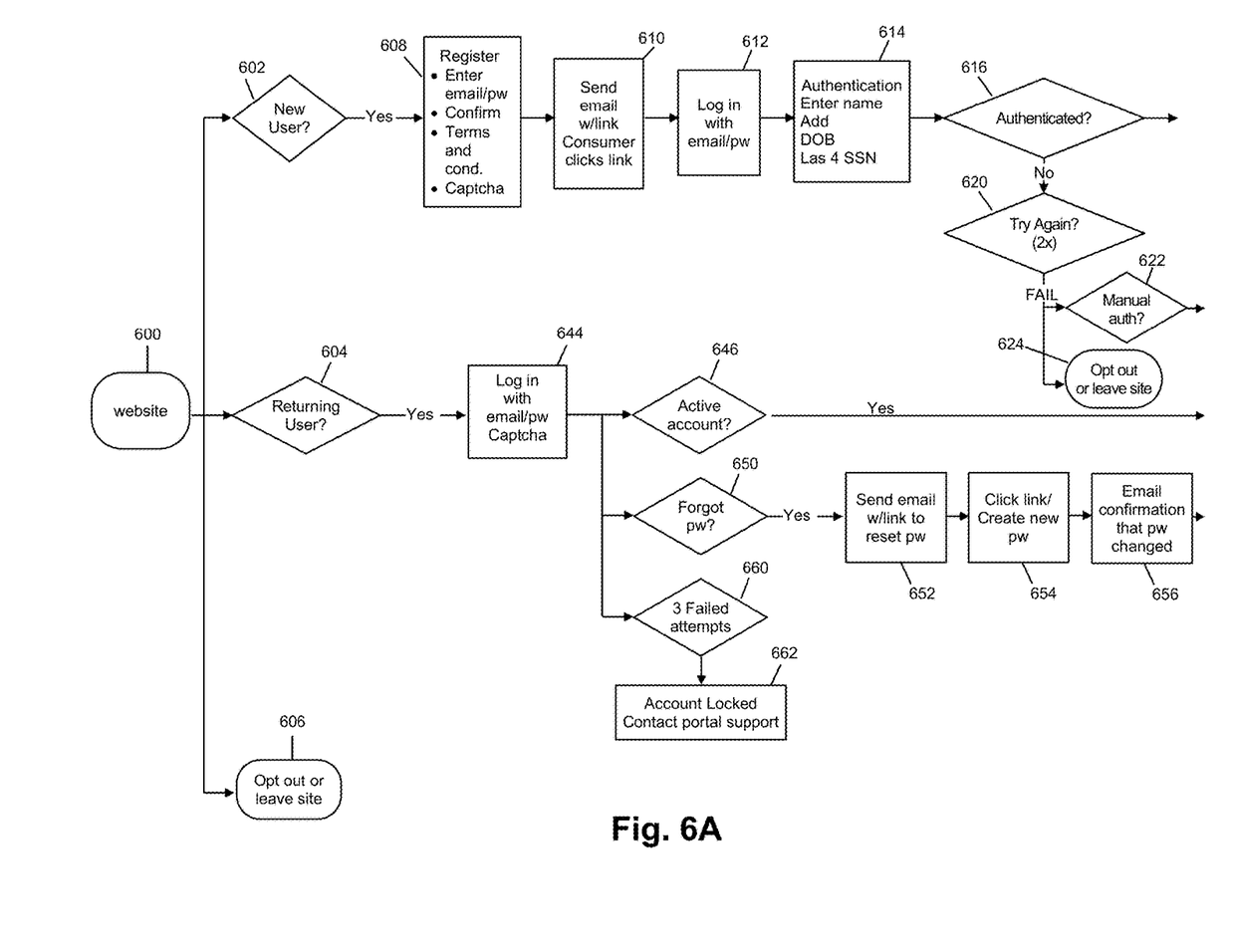
FIGS. 6A-6C are an overall process flow diagram for a preferred embodiment of the present invention.
Figure 6B:
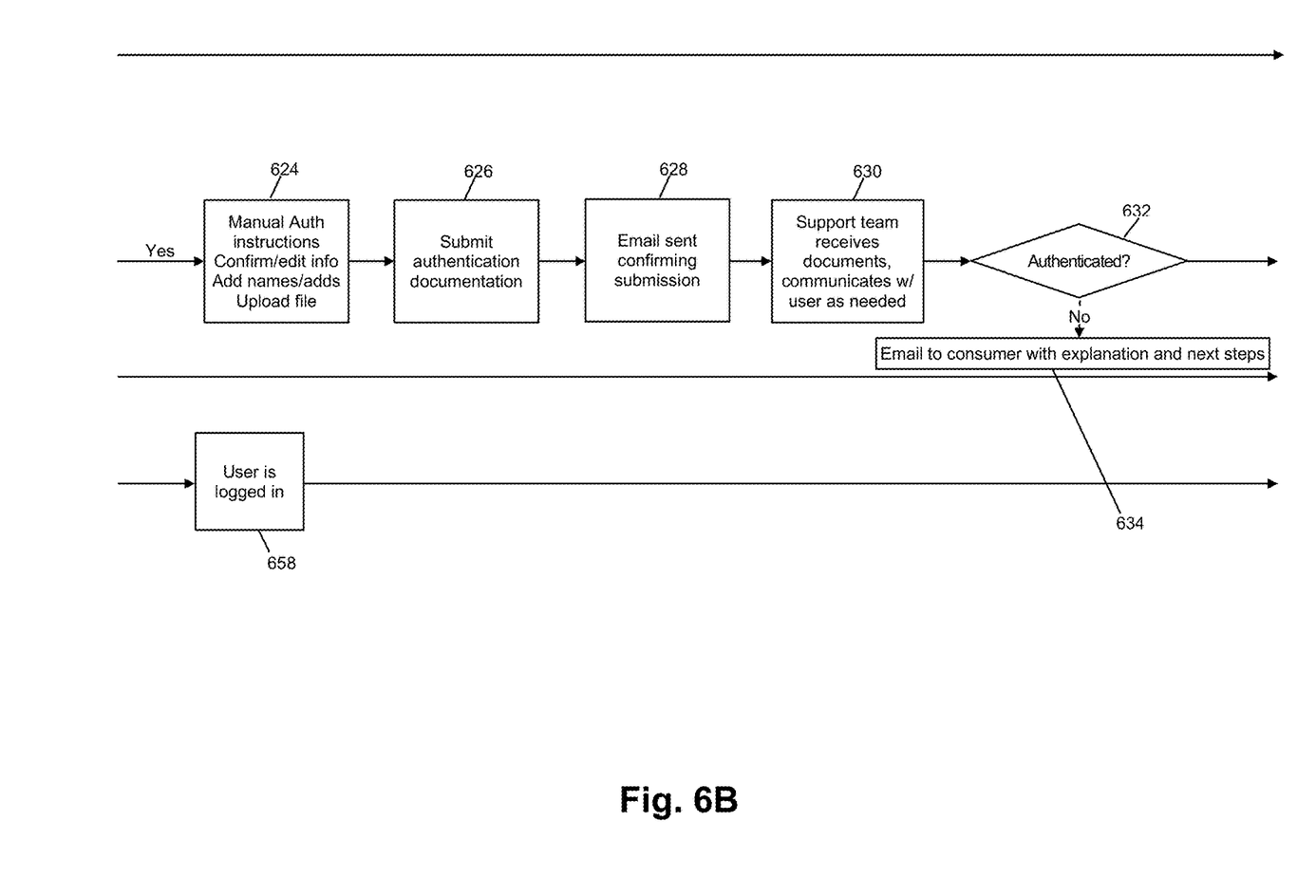
Figure 6C:
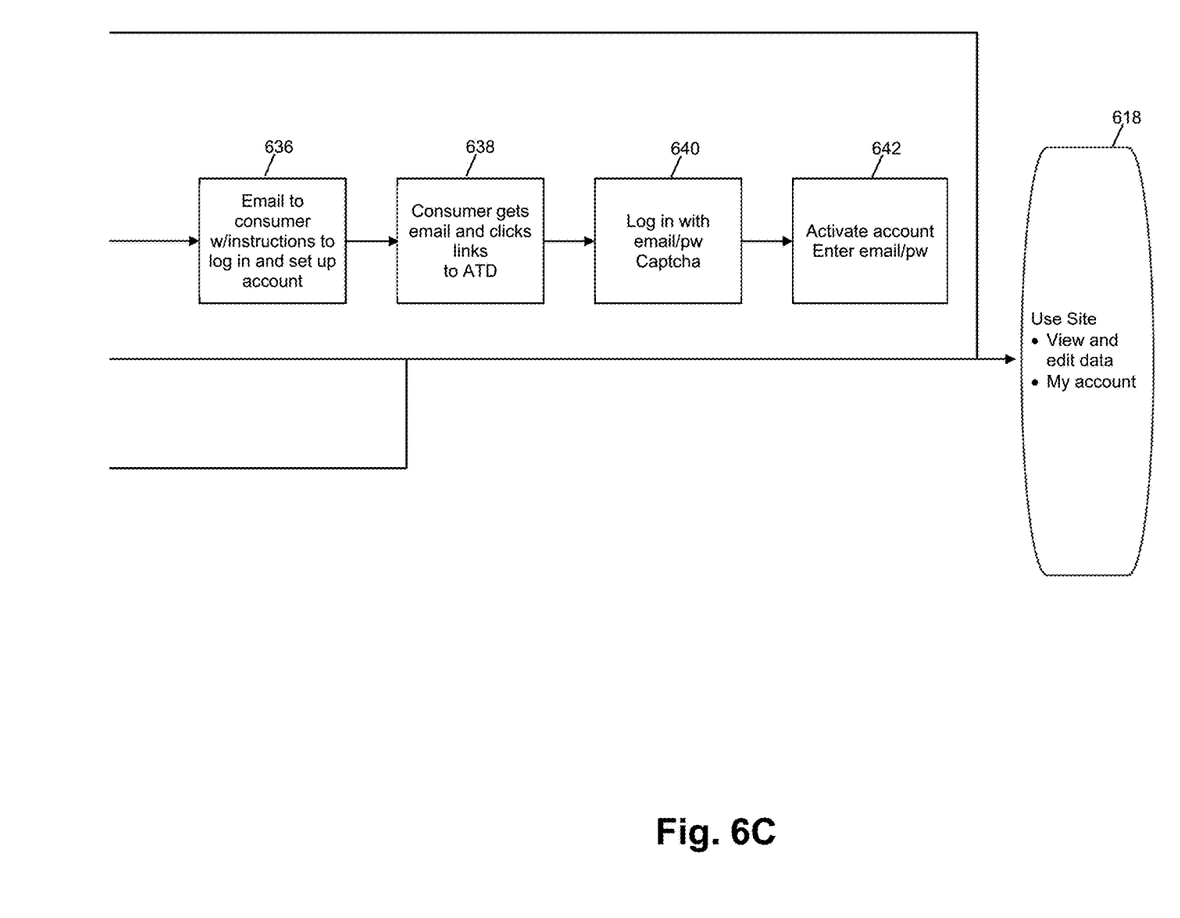
Figure 7:
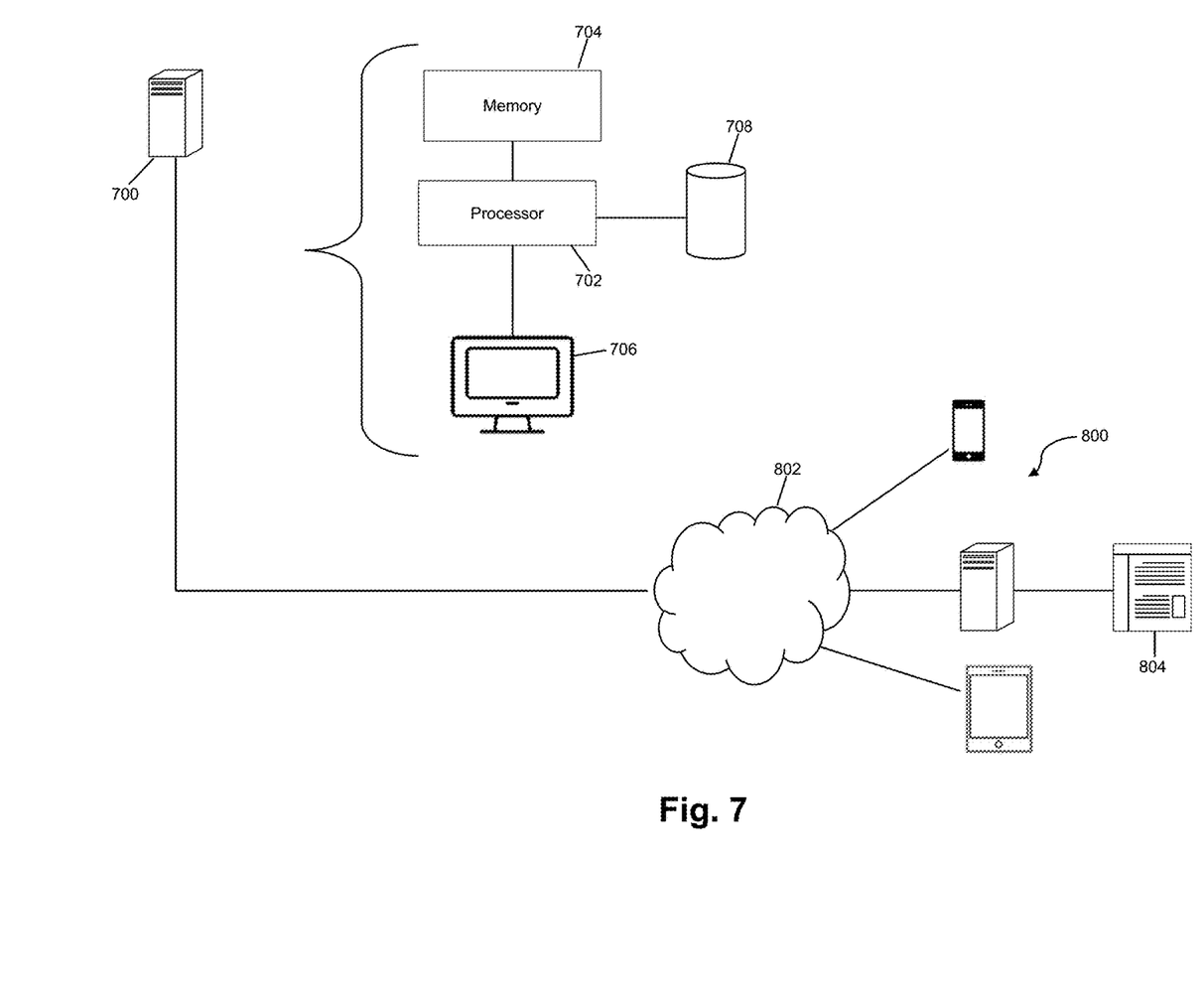
FIG. 7 is a diagram depicting a portal device for implementing the web portal on a network according to a preferred embodiment of the present invention.

The steps in using a preferred embodiment of the present invention may be described with reference to FIGS. 2-7, with FIG. 1 showing related data structures, FIGS. 2-5 showing elements used in the processing, FIGS. 6A-6C being a flowchart showing steps and decision making in the process, and FIG. 7 showing hardware elements used in the process. In certain embodiments as illustrated, the consumer has access to a web browser at a connected client computing device 800. Client computing device 800 may be, for example, a desktop computer, laptop computer, smartphone, or tablet. Using client computing device 800, various types of software may be used for access to the consumer portal, including traditional web browser software 804, but also various mobile applications, application programming interfaces (APIs), and other software services. Access is made through network 802, which is preferably the Internet but may include other types of networks. The consumer portal is hosted at portal device 700, which in certain embodiments is a computer server but may be other types of computing equipment as described below.

Referring now to FIGS. 6A-6C, the process flow for the various steps in operation of registering and logging in to the consumer portal according to a preferred embodiment of the present invention may be described. At step 600, the consumer accesses the consumer portal at portal device 700 across network 802 from client computing device 800. A consumer may then access web page 200 (FIG. 2) that is associated with the consumer portal. The consumer is presented with the options of registering as a new user at step 602, accessing the site as a returning user at step 604, or opting out without creating an account or logging in at step 606. In the case of a new user, processing moves to registration at step 608. The consumer is presented with the first step of a registration process with registration form 202 shown in FIG. 2. Through registration form 202, the consumer may create an account with the provider of the consumer portal utilizing certain information related to the consumer, preferably by using an email address associated with the consumer and a password chosen by the consumer. The user is preferably asked twice for the chosen password in order to confirm that it was typed correctly. The user is also asked to agree to the terms of use for the consumer portal before proceeding. In certain embodiments, the user may further be asked to deselect any options for use of the user's email that are not desired. Those options may include sending updates about the consumer portal; sending notifications about promotions related to the consumer portal; and sending notifications from trusted third parties that are associated with the consumer portal. Finally, the consumer may be presented with "CAPTCHA" text that must be typed in an appropriate box. CAPTCHA text is a well-known method of distinguishing between human users of a website and automated users, thereby serving to prevent unauthorized uses of the website or attacks by automated systems.

Figure 2:
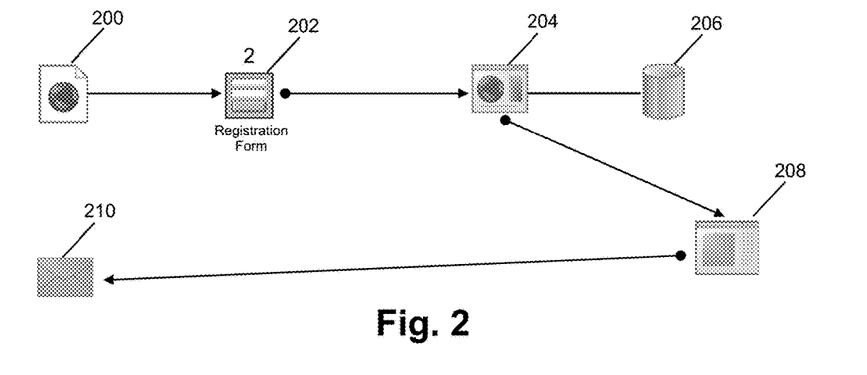
FIG. 2 is a diagram showing elements for receiving a registration request for the consumer portal according to a preferred embodiment of the present invention.

Data from registration form 202 is passed on to web application service layer 204 as shown in FIG. 2, and is stored by web application service layer 204 in credentials table 206. Email web page 208 is then displayed at client computing device 800, by which the consumer is notified than an automated email 210 has been sent to the consumer's designated email address in order to move to the next phase in registration for use of the consumer portal. Credentials table 206 stores certain information related to the consumer's account with the consumer portal, including the consumer's email address and password, and whether the consumer wishes to opt-in to communications from the consumer portal provider as described above. In addition, in certain embodiments this information includes an activation token as described below, and a date of activation of the consumer's consumer portal account. Credentials table 206 further may include a unique identifier or "link" for the consumer in order to unambiguously distinguish the consumer from other consumers in the geographic area of interest, as further described below.

Figure 3:
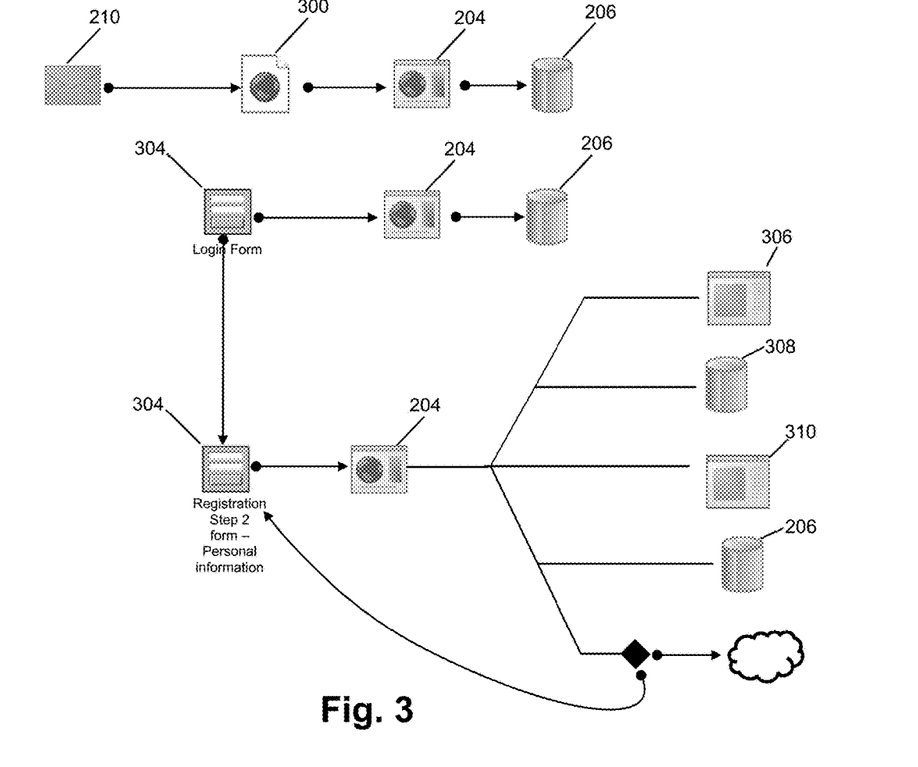
FIG. 3. is a diagram showing elements for registration with the consumer portal according to a preferred embodiment of the present invention.
Figure 4:
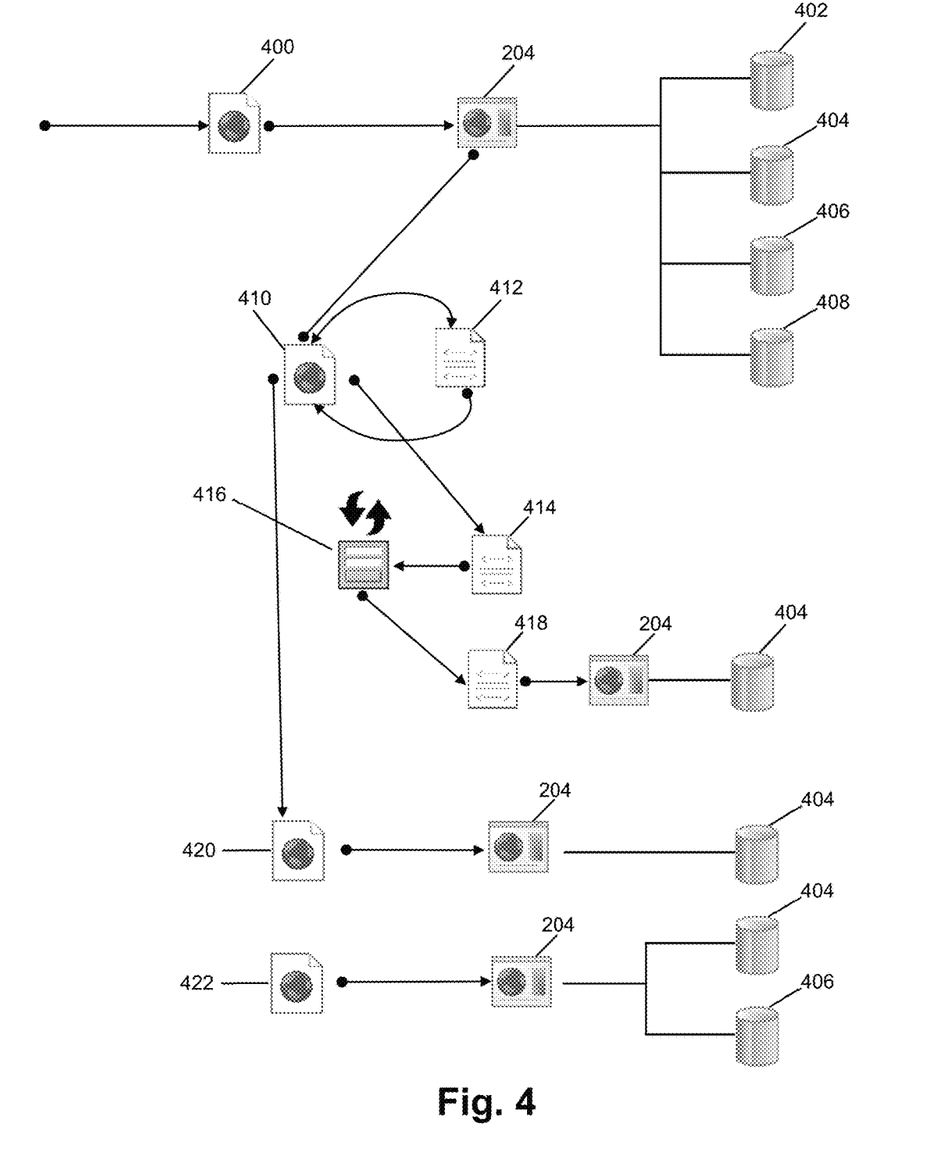
FIG. 4 is a diagram showing elements for verifying and updating information using a consumer portal according to a preferred embodiment of the present invention.

The user can next open the email using client computing device 800 and click on the provided link in the email in order to log in to the consumer portal at step 612 using the email address and the password generated at step 608. Referring now to FIG. 3, the consumer opens email 210, and clicks a link presented in the body of email 210. This link contains an activation token for the consumer, as stored in credentials table 206 for the consumer. The consumer portal provider's web application 300 makes a call to the web service layer 204 using this activation token. The consumer's credentials table 206 is then updated by the consumer portal in order to indicate that the email address for this consumer has now been validated. Next, the consumer portal web application presents a login screen 304 to the consumer at his or her web browser 804 or other access software on client device 800. In order to log in, the consumer enters his or her email address and password at login form 304 at step 612 of FIG. 6A. This form is submitted to web application service layer 204 in order to check the data entered against the data stored at credentials table 206. If the information is verified, then personal information form 306 is presented to the consumer at his or her web browser, at step 614 of FIG. 6A. The purpose of this step is to verify that the consumer is actually the person that he or she indicates. The user then fills out personal information form 306, and web application service layer 204 provides this data to link service 306.

Authentication data is entered by the consumer at step 614 in order for the consumer portal to verify that the consumer is in fact the person he or she claims to be, thereby preventing the access of private information about a consumer by an unauthorized party. In certain embodiments, the authentication data includes personally identifiable information (PII). Further in certain embodiments, the authentication data excludes data that is specific to a particular device (client computing device 800) from which the consumer is accessing portable device 700, such as cookie data. It may be seen that in this way the system provides true authentication of an actual person, rather than authentication based on a particular device used by the consumer. This avoids ambiguities or privacy-related problems with consumers using multiple devices to access portal device 700, or with multiple individuals using the same client computing device 800. The type of information called for at step 614 is preferably as follows:

1. Full First Legal Name
2. Middle Name
3. Last Name
4. Suffix
5. Street Address
6. Address line 2
7. City
8. State
9. ZIP code
10. Birth Month, Birth Day, and Birth Year
11. Last 4 Digits of Social Security Number These various options apply to U.S. consumers in certain embodiments, but may be varied for use of the consumer portal by persons residing in other countries where, for example, other forms of government-issued identification may be used. Once the data is entered and the user clicks "submit," the user is given an opportunity to review the information again before attempting authentication. The user then confirms, and receives an on-screen notification concerning the authentication results. This data is stored at user information table 409 as shown in FIG. 1.

Link service 306 as shown in FIG. 3 operates to return a unique identifier or "link" for the consumer. A link may be, in various embodiments, any sort of numeric or alphanumeric identifier associated with the consumer. Links are stored in a database that contains a unique link for substantially all of the linked entities in a particular region, such as substantially all consumers or all households in a geographic area. Each of the links is unique across the universe of all such entities in the geographic area, such that a link unambiguously identifies a particular entity. For example, in the set of links there may be a link for each consumer in the United States, with each link being unique from all other links in the set of links in order to unambiguously identify data associated with each of the consumers in the United States. Link service 306 operates to return the appropriate link for the consumer accessing the consumer portal. Link service 306 enables the service to bring together all of the appropriate information for this particular consumer in a privacy-compliant manner. The method of constructing such links and of arranging them in order to manage data about a universe of consumers may, in a preferred embodiment, be performed as taught in U.S. Pat. Nos. 6,523,041 and 6,766,327, each of which are incorporated by reference as if set forth in their entirety herein. One such linking service is AbiliTec, which is provided by Acxiom Corporation of Little Rock, Ark. Once link service 306 returns the appropriate link for the consumer, the link and the user's details are then stored in user details table 308.

In addition to retrieving a link with link service 306, risk/identify service 310 is called with the consumer's information in order to determine whether this information matches information used by risk/identify service 310 for authentication. The service then updates credentials table 206 to indicate whether the risk/identify service 310 generated a success or failure to match. If risk/identify service 310 generates a success result, then processing moves to the next step after identification has been established. If risk/identify service 310 generates a failure result, then the consumer is informed of the failure and may retry or may manually verify his or her identity. As shown in FIG. 6A, if the consumer passes authentication at query 616, then processing moves to use of the consumer portal at step 618. If the consumer fails authentication at authentication query 616, then the consumer may try again at query 620. After two failed attempts, the user may attempt manual authentication at query 622, or may decide to opt out of use of the site at step 624.

It may be seen that link service 306 and risk/identify service 310 operates to uniquely identify a single individual, and thereby prevents multiple accounts from being created for the same individual, even where that individual may access the system from multiple devices or locations. Link service 306 and risk/identify service 310 is not dependent upon cookies that are stored on a particular client computing device 800, nor is it dependent upon any other device-specific data or data structures. In this way, the problem of creating multiple accounts for the same consumer due to the use of multiple client computing devices 800 is avoided. The consumer portal allows for a consumer to block account creation based off of the "link" provided from link service 306 in circumstances where the consumer may request it, in order to prevent others from attempting to create an account with that consumer's information. Likewise, this functionality also prevents the potential problem of a single account being created that pertains to more than one consumer.

In certain embodiments, risk/identify service 310 may also match information against a "deceased" table. If the consumer-provided input matches data from the deceased table, then the consumer will not pass authentication. Matches are scored based on elements at identity/risk service 310. Although certain fields, as noted above, are not required, they may still be useful in identifying the correct person. For example, a suffix can help to distinguish between a father ("Sr.") and a son ("Jr.") who otherwise have the same name. Of the information collected at step 614 all information is utilized by risk/identify service 310 to match a specific individual. risk/identify service 310 returns a score representing a percentage match against expected data for certain information such as full name, date of birth, and last four digits of Social Security number. The consumer portal uses configurable match thresholds for this information as criteria for authenticating a consumer's identity.

If the user is unable to automatically authenticate using the risk/identify service 310, then processing moves to step 624 for manual authentication. The user confirms authentication data, and then at step 626 the user uploads authentication documents to the system. Such documents may include, for example, a scanned copy or photograph of the user's driver's license or other government-issued identification card, a current utility bill, or a cancelled check. Preferably, these documents may be uploaded in various formats, such as .jpg, .gif, .pdf, and the like. The documents are preferably stored by the consumer portal application for a minimum of three years, and cannot be accessed by the consumer or others over the Internet once they are uploaded. The documents are encrypted while stored after uploading. At step 628 the consumer portal application sends an email confirming upload of the authentication documentation. Support personnel then review the authentication documentation at step 630. At query 632 it is determined if the authentication documentation supports authentication; if not, then at step 632 the support personnel contact the consumer and advise of the status and further provide additional steps, if any, that could be taken to remedy the failure to authenticate. If authentication documentation is accepted, then processing moves to step 636, at which an email is sent by the consumer portal application to the consumer with a link for login and instructions. At step 638, the consumer receives the email with a link to the web page for the consumer portal. The consumer can then login using email and password at step 640, and at step 642 activate his or her account with the consumer web portal.

At step 604, a returning user who has previously registered may login to the consumer portal. This is performed using email and password as previously described at step 644. So long as the account is an active account at query 646, then processing moves to step 618 to review data. If, however, the consumer has forgotten his or her password at query 646, the user is given the option of clicking on a "forgot password" link, and the user is sent an email with a link for password recovery at step 656. When the user clicks the link and creates a new password at step 654, the user will then receive a confirmation that the password has changed at step 656. The user can then login with the new password at step 658, and continue to step 618 to review data. If the user is unable to correctly enter email and password after three failed attempts at query 660, then the user's account is locked at step 662 to prevent unauthorized access. The account cannot be unlocked until the consumer contacts support personnel for the consumer portal application to recover the account or the consumer utilizes the "forgot password" link.

The consumer is given the option at step 606 to opt out of the marketing service provider's marketing products and services without the necessity of either creating an account or logging into such account. There may be separate opt-out options for simply opting out of cookie-based digital marketing achieved in certain embodiments by having the user authorize the placement of an opt-out "cookie" on the user's computer, which marketers may use in the future in order to identify the consumer who has opted out of targeted marketing; or opting out of all marketing products, including traditional direct mail products. The opt-out cookie in certain embodiments does not prevent the consumer from seeing digital marketing messages on his or her device, it simply means that the consumer portal provider will no longer share digital marketing data about the consumer with marketers. If the consumer opts out of traditional marketing, then the consumer may be given various options such as: direct mail, telemarketing, email marketing, or online marketing. This will reduce the amount of unsolicited telemarketing, direct-mail and/or email offers the consumer may receive from companies with whom he or she has not done business. It may also, however, reduce the relevance of offers received from companies with whom the consumer has done business, since the marketers use these products to better understand what offers may be of interest to the consumer. To complete the opt-out process, the consumer supplies name and address information. Once submitted, the consumer record is then added to an opt-out file, which is updated periodically or alternatively in real time. Internal processing by the marketing services provider then scans the opt-out file during its periodic maintenance process related to its marketing databases and suppresses from further use any records that are also on the opt-out file.

Once the consumer reaches step 618 to view and potentially edit data about that consumer, the consumer is effectively shown all or a subset of that data that is maintained by the marketing services provider concerning that consumer. The user is sent to review data web page 400 shown in FIG. 4, where the user is presented with various categories of information about the consumer and has the option to click on a category of information to view. In certain embodiments there are six categories of data, the categories being stored at category table 401 as shown in FIG. 1:

1. Characteristic Data: information about the consumer or others in the consumer's household who share the consumer's last name or address (such data may include age, marital status, education, and presence of children).
2. Home Data: information about the consumer's home (primarily from publicly available property transaction records), such as whether the consumer may rent or own, property type (single family dwelling, multi-family dwelling) and length of residence.
3. Household Vehicle: information about vehicles in the consumer's household, such as make and model, number of vehicles, and auto insurance renewal date, which is sourced from warranty and service records and thus may not present a complete picture.
4. Household Economic Data: information about a household's finances such as estimated household income level and preferred payment methods, which come from consumer-reported registration, survey, or census neighborhood statistics. Lines of credit information is based on household purchase activity.
5. Household Purchases: a snapshot of information about online and offline purchases associated with a household from a sampling of retailers. This data may represent a small sample of a household's actual purchase activity, and only represents a segment of retailers. This data does not come from credit cards companies, banks or other financial institutions in order to ensure compliance with privacy laws and regulations.
6. Household Interests: information about the interests and hobbies of a member of the consumer's household such as gardening, traveling, and sports. This information may come from surveys and purchases, such as magazine subscriptions.

Any number of categories may be presented in alternative embodiments. These categories may be dynamic, and thus may be changed by modifications to category table 401. When the consumer clicks on a category of information to view, web application service layer 204 submits the category to data append service 402 in order to retrieve the appropriate data elements for that category for the consumer. These elements and their associated active dates are preferably cached in data cache table 407 (see FIG. 1) for use within this consumer portal session, in order to enhance the user experience by not requiring service calls on subsequent clicks to view category data. Any changes the consumer has previously made are integrated into what the consumer views at his or her web browser in order that the consumer can see that he or she has made changes and what the previous value was, as explained further below. In addition, valid options available to the consumer and any information to be displayed to the consumer at his or her web browser are looked up at metadata table 405, which stores the elements of a particular category of metadata, and for each such element a description, display order, name, type, and source. For each element stored in metadata table 405, there is an associated valid value set stored in valid values table 403, in order to track the valid values accepted for each of the elements in metadata table 405. For example, within the category "characteristic" data as shown in category table 401, there is the element marital status stored at metadata table 405, for which valid values include "married" and "single" that are stored in valid values table 403.

The data displayed in the site reflects what was in this database at the time the file was provided for this purpose; in certain embodiments, this file is refreshed periodically, such as once per month, or could alternatively be refreshed in real time. Upon logging in, the consumer portal calls the database with the consumer's information. The database returns any of the designated data elements that have values populated for the user. If any of the values are blank, the consumer portal will, in certain embodiments, not display the element. The elements are displayed by category according to category table 401. The consumer clicks a category to see the elements and their values within that category. If the consumer does not agree with a value or does not wish that value to be used, the consumer can click "edit" and select a different value, or delete the element from being used about them for marketing.

Once the look up is completed, the list of data elements about the user for the selected category from data append service 402 are displayed to the user on data elements page 410. Page script 412 is used to construct the table displayed to the user on data elements page 410. When the consumer clicks on a particular link within the page in order to edit a data element, a call is made to element edit script 414. Edit element script 414 constructs edit element form 416 and presents edit element form 416 to the user. When the user edits an element on edit element form 416, and clicks the "save" button in order to save the new value for this element, element save script 418 makes a call back to the web application service provider 204 in order to update the value for this particular element. Both the previous value and the new value are stored in session table 404 for later use and display to the consumer. It may be noted that this process can be repeated in order to update any or all of the various elements in metadata table 405 displayed to the user on data elements page 410. The process can be repeated for each of the categories in category table 401. In addition, the user can opt out entirely of each element.

In certain embodiments, each element displayed about the consumer also allows the consumer to choose to delete this data for marketing purposes. If the consumer selects this option (at the element level), that choice is recorded with a special character in the field that otherwise would contain this data, such that once extracted using process 500, any marketers receiving data about this consumer will not receive the data but instead will identify the special character in the field where the data would otherwise be, indicating that no data is being supplied. In this way, consumer-specific information for this element is not passed to other systems.

Once the consumer has completed edits, the consumer may click a link to preview all of the changes that have been entered on preview web page 420. Preview web page 420 makes a call to web application service provider 204 in order to access session table 404 to display all of the previous and current values for the preview. To make these changes permanent, the user clicks a "save" button on confirm web page 422. A call is then made back through web application service provider 204 to commit the element changes, and web application service provider 204 then pulls the changes out of session table 404 and commits them to change table 406. From change table 406, these changes will later be utilized to update data services provided by the consumer portal provider. Any data modifications submitted by the consumer are reflected immediately on screen, and updated in the appropriate marketing data services during the next regularly scheduled update. Changes remain in effect for a configurable amount of time before being replaced by a default or source value.

Figure 5:
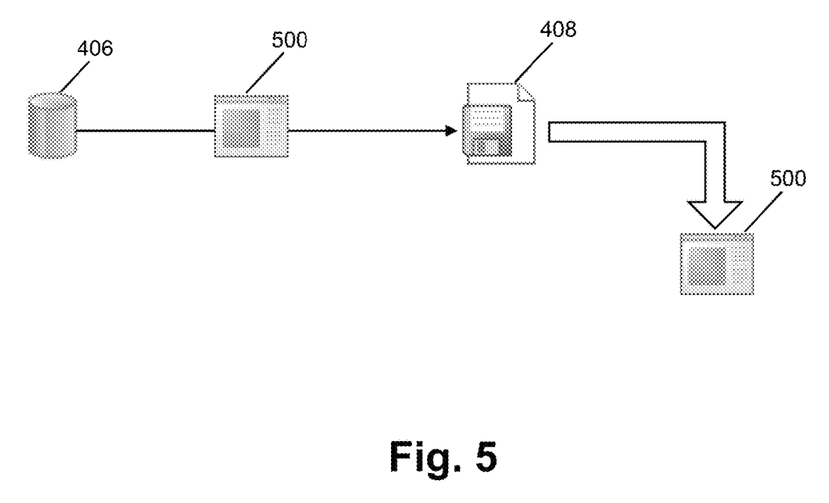
FIG. 5 is a diagram showing elements for updating a marketing service provider's database using data received at a consumer portal according to a preferred embodiment of the present invention.

Referring now to FIG. 5, when changes from change table 406 are to be periodically entered, change application 500 calls to change table 406 to read the appropriate data elements and generate a change file 408 that is formatted such that it can be utilized to update various data services provided the consumer portal provider. Change application 500 then delivers the change file to the data services build team for the load process, which treats the change file as a priority data source and the user's changes and opt-outs are integrated into various data services used by the consumer portal application and data services otherwise commercially sold by the data service provider.

At step 618 of FIG. 6C, the user may in certain embodiments also have the ability to manage account settings by clicking on an appropriate link, such as one labeled "My Account." With the account manager the consumer may change contact information, add or change email addresses and telephone numbers, change the password, change or manage email preferences, and delete the consumer's account. Consumers may view, but in certain embodiments cannot edit, the information that is used for purposes of authenticating them to the consumer portal application. In other embodiments, there may be a service that allows the consumer to edit this data and capture updates from the customer, for example, a new address.

The preferred embodiment of the consumer portal application is implemented as a portal device 700 as illustrated in FIG. 7, which is programmed by means of instructions to result in a special-purpose computing device to perform the various functionality described herein. Portal device 700 may be implemented in a number of different forms. For example, it may be implemented as a standard computer server as shown in FIG. 7, or as a group of such servers. Portal device 700 may also be implemented as part of a rack server system, as are well known in the art. In addition, it may be implemented in a personal computer such as a desktop computer or a laptop computer.

Portal device 700 includes processor 702, memory 704, an input/output device such as display 706, and storage device 708, such as a solid-state drive or magnetic hard drive. Each of the components 702, 704, 706, and 708, are interconnected using various buses, and several of the components may be mounted on a common PC board or in other manners as appropriate.

Processor 702 may execute instructions within portal device 700, including instructions stored in memory 704. Processor 702 may be implemented as a single microprocessor, or may be implemented as a chipset that includes separate and multiple analog and/or digital processors. Processor 702 may provide, for example, for coordination of the other components of portal device 700, such as control of user interfaces, applications run by portal device 700, and wireless communication by portal device 700.

Memory 704 stores information within portal device 700. The memory 704 may be implemented as one or more of a computer-readable medium or media, a volatile memory unit or units such as flash memory or RAM, or a non-volatile memory unit or units such as ROM. Memory 704 may be partially or wholly integrated within processor 702, or may be an entirely stand-alone device in communication with processor 702 along a bus, or may be a combination such as on-board cache memory in conjunction with separate RAM memory. Memory 704 may include multiple levels with different levels of memory 704 operating at different read/write speeds, including multiple-level caches. In one implementation, a computer program product is tangibly embodied in an information carrier. The computer program product contains instructions that, when executed, perform one or more processes, such as those described above.

Display 706 provide for interaction with a user, and may be implemented, for example, as a LCD (liquid crystal display) monitor for displaying information to the user, and a keyboard and a pointing device, for example, a mouse, by which the user may provide input to the computer. Other kinds of devices may be used to provide for interaction with a user as well.

Various implementations of the systems and methods described herein may be realized in digital electronic circuitry, integrated circuitry, computer hardware, firmware, software, and/or combinations thereof. These various implementations may include implementation in one or more computer programs that are executable and/or interpretable on a programmable system including at least one programmable processor 702, which may be special or general purpose, coupled to receive data and instructions from, and to transmit data and instructions to, a storage system, at least one input device, and at least one output device. These computer programs (also known as programs, software, software applications or code) include machine instructions for programmable processor 702, and may be implemented in a high-level procedural and/or object-oriented programming language, and/or in assembly/machine language. As used herein, the terms "machine-readable medium" and "computer-readable medium" refer to any computer program product, apparatus and/or device (for example, magnetic discs, optical disks, RAM memory, and programmable logic devices) used to provide machine instructions and/or data to a programmable processor, including a machine-readable medium that receives machine instructions.

In the illustrated embodiment of FIG. 7, portal device 700 communicates with client computing device 800 over communications network 802, which may be a local area network ("LAN"), a wide area network ("WAN"), or the Internet. Client computing device 800 may be any type of computing device that is capable of accessing the Internet, examples being given above. Client computing device 800 is preferably operable to run a web browser 804, such that a user at client computing device 800 may visualize information displayed at client device 800 that is transmitted from portal device 700. Client computing device 800 is further operable, through various components similar to those described with respect to portal device 700, to both send and receive information in order for the various functions and algorithms described herein to be performed at portal device 700.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method comprising the steps of:
   a. receiving at a processor of a portal device a set of login information related to a consumer;
   b. generating at the processor of the portal device a request for authentication data about the consumer, wherein the authentication data comprises personally identifiable information (PII);
   c. receiving authentication data about the consumer at the processor of the portal device;
   d. at a risk/identity service in communication with the portal device, verifying that the authentication data about the consumer is correct;
   e. at a link service in communication with the portal device, using the authentication data to identify a link associated with the consumer, wherein the link is a unique numeric or alphanumeric identifier drawn from a set of links maintained at a marketing database, further wherein each link of the set of links is uniquely associated with a single one of a plurality of consumers associated with a geographical area, further wherein the set of links comprises a link for substantially all of the plurality of consumers associated with the geographical area, further wherein the link is associated in the marketing database with a plurality of consumer data elements each associated with the customer, further wherein each of the plurality of consumer data elements are stored in a metadata table, and further wherein associated with the metadata table is a valid values table comprising a set of valid values for that one of the plurality of consumer data elements stored in the metadata table;

f. utilizing the link to locate the plurality of consumer data elements associated with the consumer from the marketing database, wherein the plurality of consumer data elements in the marketing database are supplied to the portal device by one or more third parties rather than by the consumer;

g. sending at the processor of the portal device a message comprising a selected one of the plurality of consumer data elements;

h. receiving at the processor of the portal device a request to view the selected one of the plurality of consumer data elements;

i. receiving at the processor of the portal device an edit request for the selected one of the plurality of consumer data elements, and in response storing in a session table a previous value of the selected one of the plurality of consumer data elements and a new value of the selected one of the plurality of consumer data elements, reading the set of valid values from the valid value table, and comparing the new value of the selected one of the plurality of consumer data elements with the set of valid values to confirm that the selected one of the plurality of consumer data elements matches a valid value from the set of valid values;

j. receiving at the processor of the portal device a confirm request, and in response storing in a change table the previous value of the selected of the plurality of consumer data elements and the new value of the selected one of the plurality of consumer data elements from the session table; and k. after waiting a configurable amount of time, replacing the new value of the selected one of a plurality of consumer data elements with a default or source value of the selected one of a plurality of consumer data elements, wherein the default or source value of the selected one of a plurality of consumer data elements comprises a value for the selected one of a plurality of consumer data elements that existed prior to the confirm request.

2. The computer-implemented method of claim 1, further comprising the steps of:

a. generating at the processor of the portal device a registration request;

b. receiving at the processor of the portal device a set of registration data, and in response generating at the processor of the portal device an email comprising an activation link; and c. generating at the processor of the portal device a login screen.

3. The computer-implemented method of claim 2, wherein the set of registration data comprises an email address and a password.

4. The computer-implemented method of claim 3, further comprising the step of generating a display message indicating that the email comprising an activation link has been sent.

5. The computer-implemented method of claim 1, wherein the authentication data comprises at least a portion of a personal identification number for the consumer.

6. The computer-implemented method of claim 5, wherein the at least a portion of a personal identification number is a plurality of digits from a social security number for the consumer.

7. The computer-implemented method of claim 6, wherein the authentication data comprises a name and a date of birth for the consumer.

8. The computer-implemented method of claim 7, wherein the step of verifying that the authentication data about the consumer is correct further comprises the step of scoring the authentication data.

9. The computer-implemented method of claim 1, further comprising the step of sending at the processor of the portal device a message comprising a plurality of categories from a category table, wherein each of the plurality of consumer data elements corresponds to at least one of the categories.

10. The computer implemented method of claim 9, wherein at least one of the plurality of categories are selected from the group consisting of characteristic data, home data, household vehicle data, household economic data, household purchase data, and household interests data.

11. The computer implemented method of claim 10, wherein each of the plurality of categories are selected from the group consisting of characteristic data, home data, household vehicle data, household economic data, household purchase data, and household interests data.

12. The computer-implemented method of claim 9, wherein the plurality of categories are stored in a data cache table accessible at the processor of the portal device.

13. The computer-implemented method of claim 1, further comprising the steps of updating the marketing database with the new value of the selected one of the plurality of consumer data elements from the change table.

14. The computer-implemented method of claim 1, wherein the authentication data excludes device-specific data.

15. A portal device comprising:

a. a processor;

b. a non-transitory computer-readable medium in communication with the processor;

wherein the processor is configured to execute program code embodied in the non-transitory computer-readable medium to provide a consumer portal by performing operations comprising:

i. generating a request for authentication data from a consumer, wherein the authentication data comprises personally identifiable information;

ii. verifying that the authentication data from the consumer is correct;

iii. using the authentication data to identify a link associated with the consumer at a link service, wherein the link is a numeric or alphanumeric identifier drawn from a set of links each uniquely associated with a single one of a plurality of consumers associated with a geographical area, further wherein the set of links comprises a link for substantially all of the plurality of consumers associated with the geographical area, and further wherein the link is associated in a marketing database with a plurality of consumer data elements each associated with the consumer;

iv. utilizing the link to search the marketing database for the plurality of consumer data elements associated with the consumer, wherein the plurality of consumer data elements are supplied to the portal device by one or more third parties rather than by the consumer, reading a category from a category table stored on the non-transitory computer-readable medium, and verifying that the authentication data about the consumer is correct by reading personal information related to the consumer from a user information table linked to the category table and associated with the consumer;

v. sending a message comprising a selected one of the plurality of consumer data elements and the category that was read from the category table;

vi. receiving at the processor of the portal device an edit request for the selected one of the plurality of consumer data elements and a new value for the selected one of the plurality of consumer data elements, reading at least one metadata table from a plurality of metadata tables, wherein each metadata table comprises a plurality of elements, and wherein each of the plurality of metadata tables are linked to a data category in the category table, reading a valid value from a valid value table from among a plurality of valid values tables each comprising at least one valid value for one of the plurality of elements, and wherein each of the valid value tables are linked to one of the plurality of elements in one of the plurality of metadata tables, comparing the new value of the selected one of the plurality of consumer data elements to the valid value, and storing the new value of the selected one of the plurality of consumer data elements; and vii. after waiting a configurable amount of time, replacing the new value of the selected one of the plurality of consumer data elements with a default or source value of the selected one of the plurality of data elements, wherein the default or source value of the selected one of a plurality of data elements comprises a value for the selected one of a plurality of data elements that existed prior to the edit request.

16. The portal device of claim 15, wherein the authentication data comprises at least a portion of a personal identification number.

17. The portal device of claim 16, wherein the authentication data further comprises a name and a date of birth.

18. The portal device of claim 16, wherein the authentication data excludes device-specific data.

19. The portal device of claim 15, wherein the processor is further configured to execute program code embodied in the non-transitory computer-readable medium to provide a consumer portal by performing operations further comprising the step of updating the marketing database with the new value of the at least one data element from the change table.

* * * * *